US006346182B1

(12) United States Patent
Bradley

(10) Patent No.: US 6,346,182 B1
(45) Date of Patent: Feb. 12, 2002

(54) PROCESS OF MAKING BIPOLAR ELECTRODEPOSITED CATALYSTS AND CATALYSTS SO MADE

(75) Inventor: Jean-Claude Bradley, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 09/667,272

(22) Filed: Sep. 22, 2000

Related U.S. Application Data

(63) Continuation of application No. PCT/US99/06430, filed on Mar. 24, 1999.
(60) Provisional application No. 60/079,144, filed on Mar. 24, 1998.

(51) Int. Cl.[7] ................................................. C25D 5/00
(52) U.S. Cl. ........................ 205/89; 205/102; 205/106; 205/109
(58) Field of Search ..................... 205/89, 102, 106, 205/109

(56) References Cited

U.S. PATENT DOCUMENTS

| | | |
|---|---|---|
| 3,485,725 A | 12/1969 | Koretzky |
| 4,031,291 A | 6/1977 | Fullenwider |
| 4,440,800 A | 4/1984 | Morton et al. |
| 4,589,959 A | 5/1986 | Nakamatsu et al. |
| 4,648,945 A | 3/1987 | Isenberg |
| 4,657,833 A | 4/1987 | Hadley, Jr. et al. |
| 4,681,665 A | 7/1987 | Guillermet et al. |
| 4,830,903 A | 5/1989 | Levy |
| 5,531,869 A | 7/1996 | Kubo |
| 5,603,819 A | 2/1997 | Harris et al. |
| 5,660,706 A | 8/1997 | Zhao et al. |
| 5,681,441 A | 10/1997 | Svendsen et al. |

*Primary Examiner*—Kishor Mayekar
(74) *Attorney, Agent, or Firm*—Akin, Gump, Strauss, Hauer & Feld, L.L.P.

(57) ABSTRACT

This invention relates to a bipolar electrochemical process for toposelective electrodeposition of a catalytic substance on an electrically conductive particulate substrate to produce a catalyst, as well as to the catalyst so produced. The process comprises: (a) placing the conductive particulate substrate and a source of the catalytic substance into an environment capable of conducting electricity; (b) aligning the conductive particulate substrate on which the catalytic substance is to be deposited with respect to an electric field such that the conductive particulate substrate is not in physical contact with electrodes and such that the catalytic substance will be deposited in a predetermined location on the particulate substrate when an electric field is applied; and (c) creating an electric field of a sufficient strength and for a time sufficient to deposit the catalytic substance from the source of the catalytic substance on the conductive particulate substrate at the predetermined location in substantial alignment with the electric field.

25 Claims, 4 Drawing Sheets

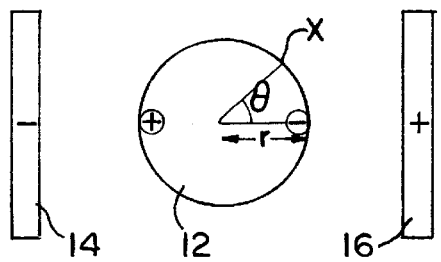
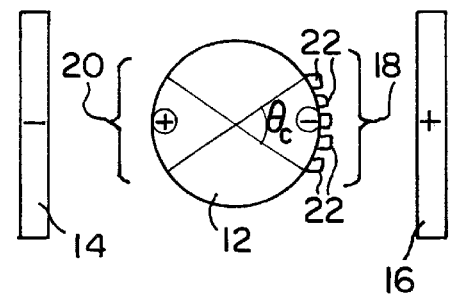
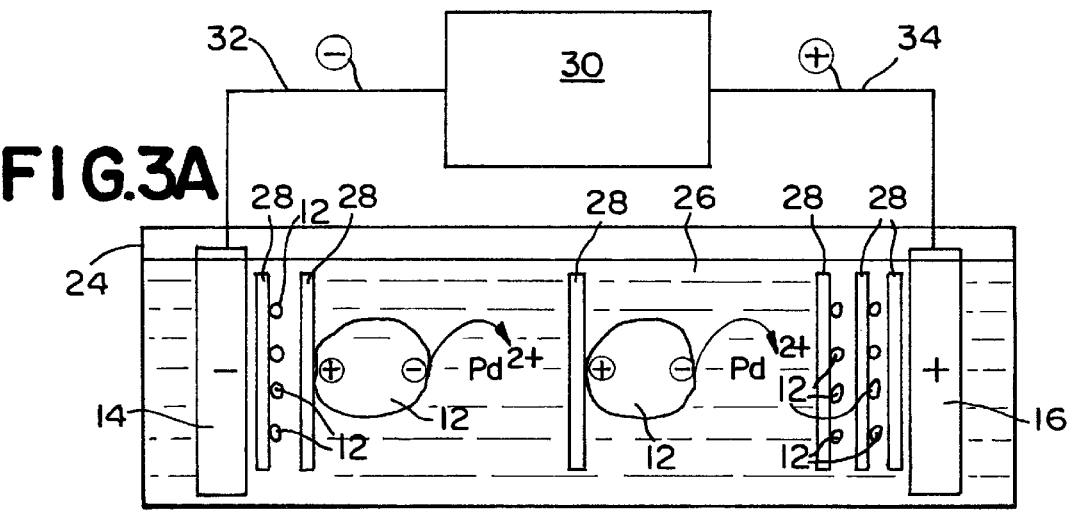
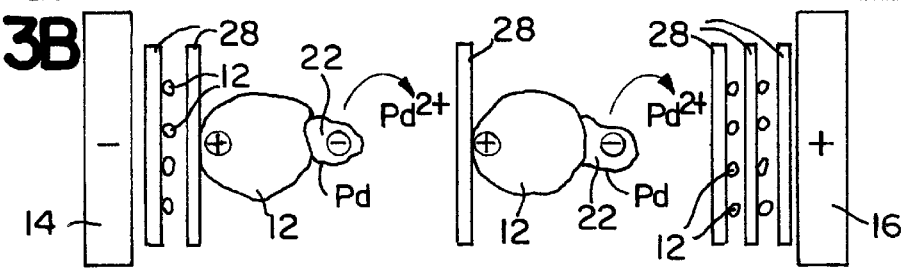
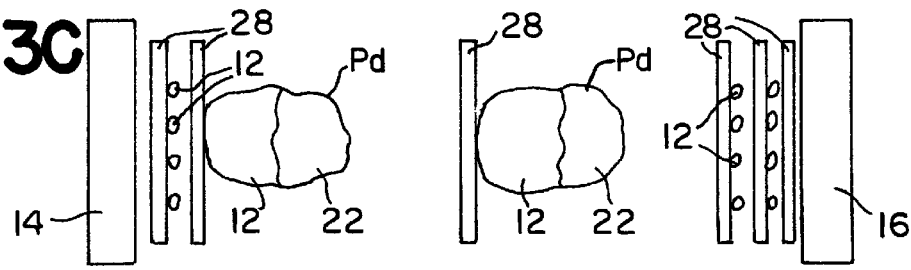

PROCESS OF MAKING BIPOLAR ELECTRODEPOSITED CATALYSTS AND CATALYSTS SO MADE

CROSS-REFERENCE TO RELATED APPLICATIONS

This application is a continuation of co-pending International Patent Application No. PCT/US99/06430, filed Mar. 24, 1999, which designates the United States, and which claims priority under 35 U.S.C. 119(e) of U.S. Provisional Patent Application No. 60/079,144, filed Mar. 24, 1998.

BACKGROUND OF THE INVENTION

This invention relates to a bipolar electrodeposition process of making catalysts, by which such catalysts may be engineered to contain a desired catalytic material or material on a predetermined location or locations of the supporting particles using site-selective (toposelective) bipolar electrochemistry.

More specifically, the invention relates to an electric-field process to prepare electrodeposited catalysts which does not require physical contact between the power source and the deposits. As will be described hereinafter, such an approach, referred to as bipolar electrodeposition, allows not only for electrodeposition of catalytic material within several centimeters of a supporting structure for the catalytic material, but also has the additional advantage that the localization of the deposit can be controlled. Even more particularly, metal nanostructures are electrodeposited onto electrically isolated conductive particles using bipolar electrochemistry. The principle relies on the polarization of the conductive particles by applying an electric field, which results in the electrodeposition of a metal salt onto the cathodic region of the particles. The result is the creation of nanoscale metallic structures at the surface of colloidal particles with spatial control without using masks, templates or physical contact with the particles.

Although catalysis and methods of making catalysts are generally well known, new environmental concerns continue to challenge these fields, for example, in providing less expensive hydrogenation processes, and in more efficient control of CO and $NO_x$ emissions. There are many known methods for producing catalysts, including, for example, thermal reduction of metal salts on supports such as alumina or titania; adsorption of preformed colloidal metal dispersions onto a support; electrodeposition of metals onto conductive supports, such as carbon, metals or conductive oxides or onto high surface area organic polymers; and photoelectrodeposition onto semiconducting support particles.

These techniques have certain limitations, in that several are not particularly well-suited for making extremely small catalyst particles, such as nanostructure particles (sub- 100 nm scale). Moreover, since catalysis is affected by both the size of the catalyst particles and their morphology, better techniques are needed to control the morphology of such small catalyst particles.

Nanostructure materials frequently exhibit properties deviating significantly from the bulk. This has been especially true in the field of catalysis, where catalytic activity and selectivity have exhibited a profound dependence upon the size and morphology of the catalyst. Both geometric (physical registry of the adsorbate with the atomic positions on the catalytic surface) and electronic (e.g. change in local electron density or conductivity) effects have been proposed to explain such behavior.

Electrodeposition is potentially a very attractive process of preparing nanostructure materials. One successful approach is electrodeposition within nanoscale templates such as porous alumina, polycarbonate membranes, within electron-beam patterned areas, at interfaces, defects within monolayers, or in the areas adjacent to a scanning tunneling microscope tip. The advantage of such a strategy is that the electrodeposited material can be prepared with excellent shape and size control, dependent upon the structure of the template. A major drawback is the necessity to obtain templates of the desired geometry.

A way of avoiding the use of templates to control electrodeposit size and morphology is to manipulate the current and voltage parameters during electrodeposition. This type of approach has been used extensively to prepare electrocatalysts. The following conditions are most often used to control the size and morphology of nano-electrodeposits.

Potentiostatic or galvanostatic conditions. In general high voltages and high currents favor smaller particles because, above the nucleation overpotential, the growth of new centers is favored at the expense of the growth of existing nuclei. For example, changing the current density from 0.1 to 5 $mA/cm^2$ can control Pd cluster size from 4.8 to 1.4 nm.

Low frequency (<0.1 Hz) cycling usually using cyclic voltametry. Changing sweep rates from 1 to 10 mV/s controlled the size of silver deposits from 93 to 18 nm. It was postulated that faster sweep rates encouraged more rapid nucleation, thus leading to smaller particles.

Pulsed Electrodeposition. Here, square pulses are applied at a desired frequency. Particle size can be easily controlled by varying the ON or the OFF time of the pulse sequence. When the pulse is ON nucleation and growth occur. While the pulse is OFF, unstable small nuclei dissolve leaving the larger nuclei to continue to grow during the subsequent ON times. Thus increasing either the ON or OFF times during pulsed electrodeposition generally leads to increases in particle size. For example it was possible to prepare nanocrystalline palladium deposits with sizes ranging from 18 to 35 nm for ON-times of 1 to 4 ms and from 20 to 95 nm for OFF times increases from 40 to 200 ms. A related technique is reversing current deposition, where smaller particles are preferentially dissolved during the anodic pulse. However, other researchers have found opposite effects and it has been postulated that when the pulse is OFF, inhibiting species have the time to passivate the deposits for further growth, thus favoring smaller particles with longer OFF times. For example, copper deposits from 10 to 83 nm can be obtained by varying the OFF times from 100 ms to 6 ms with 1 ms ON times. Regardless of the direction of the effect, it is clear that particle morphology and size on the nanoscale can be controlled by pulsed electrodeposition with ON and OFF times on the 1–200 ms time scale.

Waveform modulation. It has also been observed that the waveform has a profound influence on the deposit morphology. For example, at 100 Hz, copper deposition size increase in the following order: square-wave>sinusoidal>triangular.

In principle, electrodeposition offers a rather convenient method of modulating the properties of metal catalysts. Indeed, electrodeposition has been used extensively to prepare metal catalysts on conductive substrates such as carbon, metals or conductive oxides. Underpotential deposition to form surfaces with modified catalytic behavior could be considered a related technology. One of the critical limitations of electrodeposited catalysts is that the deposited area is essentially limited to the electrode surface. In order to increase the available surface area of electrodeposited catalysts, electrodeposition of metal structures within polymers such as polyvinylpyridine, polyvinylacetic acid, and NAFION® has been actively explored. A recently developed related approach is electrodeposition within thin gel coatings. However, such approaches are limited to coatings of only a few micrometers thick because of the difficulty of assuring an ohmic or electron hopping contact with the growing electrodeposit while maintaining a highly permeable structure for rapid reagent diffusion and high surface area. Furthermore, small isolated deposits cannot usually be obtained by this method because of the necessity of having an electrically contiguous structure from the electrode extending into the matrix.

Other attempts to increase the thickness of electrodeposited catalysts include the use of conductive polymers such as polypyrrole, polyaniline or viologen-based polymers, since electron conduction can occur through the polymer. However, due to anisotropic field distributions and the finite resistivity of the conductive polymer, it is unlikely that homogeneous electrodeposition will be possible within volumes more than a few micrometers thick using this approach. Furthermore, the choice of support is limited to conductive polymeric materials in electrical contact with an electrode.

One electrodeposition tactic that avoids electrical contact with the conductive support is photoelectrodeposition onto semiconductive particles. This has been used extensively as a method of electrodepositing catalytically active metals (e.g. Au, Pt, Pd, Ag, Rh, Ir) onto a dispersed semiconducting support (e.g. $TiO_2$, ZnO, $SnO_2$, $ZrO_2$, $ThO_2$, CdS, $WO_3$). In this case photons promote electrons from the valence band into the conduction band of the semiconducting particles, creating a situation where anodic and cathodic processes occur on different regions of the same particle. Although this method has been successful in producing catalysts, it requires the use of a semiconductor with a bandgap tuned to the wavelengths capable of penetrating into the sample. Furthermore, due to absorption of light, homogeneous exposures within large volumes is not possible without prolonged mixing.

In all of the above methods except photoelectrodeposition, an ohmic contact between the electrodeposit the electrode is necessary. A crucial concept in the present invention is the elimination of this requirement by the use of bipolar electrochemistry, which is described in more detail hereinafter. Another crucial concept in the present invention is to control the properties of the catalysts and catalytic systems containing the catalyst particles by modulating electric field parameters during their preparation. Thus, in accordance with the present invention, control of the electric field parameters involved in the bipolar electrochemical process of making the catalysts, particularly the direction and intensity of the applied field among others set forth hereinafter, is responsible for creating a catalyst having desired predetermined structure and properties.

SUMMARY OF THE INVENTION

One aspect of the present invention relates to a bipolar electrochemical process for toposelective electrodeposition of a catalytic substance on an electrically conductive particulate substrate comprising: (a) placing the conductive particulate substrate and a source of the catalytic substance into an environment capable of conducting electricity; (b) aligning the conductive particulate substrate on which the catalytic substance is to be deposited with respect to an electric field such that the conductive particulate substrate is not in physical contact with electrodes and such that the catalytic substance will be deposited in a predetermined location on the particulate substrate when an electric field is applied; and (c) creating an electric field of a sufficient strength and for a time sufficient to deposit the catalytic substance from the source of the catalytic substance on the conductive particulate substrate at the predetermined location in substantial alignment with the electric field.

Another aspect of the present invention relates to the various catalysts produced by the process of the present invention.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1 is a schematic representation of the polarization of a conductive particle in an electric field.

FIG. 2 is a schematic representation showing toposelective deposition of a catalytic substance in a predetermined location on the conductive substrate shown in FIG. 1 using the bipolar electrochemical process according to the present invention.

FIG. 3A is a schematic representation of a bipolar electrochemical cell depicting the beginning of the formation of an exemplary catalyst according to the bipolar electrochemical process of the present invention.

FIG. 3B schematically depicts the formation of the catalyst using the cell of FIG. 3A, but further along in the process, illustrating the formation of a Pd deposit on a targeted portion of the electrically conductive particulate substrates.

FIG. 3C depicts the completed Pd catalyst using the cell of FIG. 3A, after completion of the bipolar electrochemical process by which Pd has been deposited on the targeted portion of the conductive particulate substrates.

DETAILED DESCRIPTION OF THE INVENTION

Figure 4:
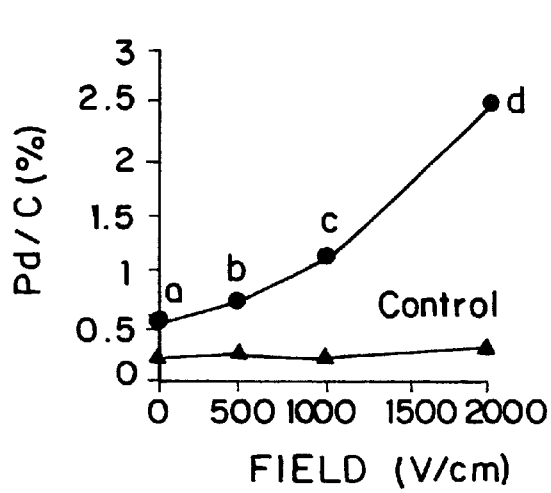
FIG. 4 is a graph depicting the Pd/C percent ratio for catalysts prepared at four different field intensities, as well as a control curve, where the ratio was determined after analysis of samples of the catalysts by atomic absorption from the samples digested in aqua regia.

The present invention uses an electric-field process to prepare electrodeposited catalysts which does require physical contact between the power source and the deposits. As will be described below, such an approach, referred to as bipolar electrodeposition, allows not only for electrodeposition within several centimeters of an optional but preferred electrically nonconductive support for the deposited catalytic substance but also has the additional advantage that the localization of the deposit can be controlled. The novel process of this invention creates electrodeposited catalysts within large volumes of non-conductive support with a much more homogenous distribution than available by other electrodeposition techniques. The present invention relies on the polarization of conductive micrometer-scale particles preferably supported within an electrically nonconductive matrix. This invention represents another application of the inventor's approach to toposelectively (site-selectively) functionalize or otherwise modify particles using electric fields. A general description of the use of bipolar electrochemistry in a process for toposelective deposition onto isolated particles leading to the formation of sub-micrometer diameter wires is disclosed in the Applicant's International Patent Application Publication No. WO 98/46810, published Oct. 22, 1998, and the corresponding U.S. Pat. No. 6,120,669, issued Sep. 9, 2000, the disclosures of which are hereby incorporated herein by reference.

In bipolar electrochemistry, when electrically isolated, but electrically conductive particulate substrates, such as graphite particles, are exposed to an electric field, each particle becomes polarized, resulting in separate anodic and cathodic regions on the same particle, as schematically shown in FIGS. 1 and 2. Since each polarized particle serves as both anode and cathode, the process is referred to as bipolar electrochemistry. With reference to FIG. 1, depicting a spherical electrically conductive particulate substrate 12 aligned in a bipolar electrochemical cell between a cathode 14 and an anode 16, as a consequence of exposing a conductive particle to an electric field, an overpotential η varying according to a cosine law is induced at the surface of the particle as indicated in Equation (1). To a first approximation, for a spherical particle of radius r exposed to an electric field E, an overpotential η is induced at a position x, expressed as an angle θ relative to the direction of the applied electric field, which extends in a direction from the anode 16 toward the cathode 14.

$$\eta_x = Er \cos(\theta) \quad (1)$$

Clearly, a maximum potential difference will occur at opposite poles of the particle. It follows that the maximum potential difference $\Delta V_{max}$ across the particle is given by Equation (2).

$$\Delta V_{max} = 2Er \quad (2)$$

Figure 10:
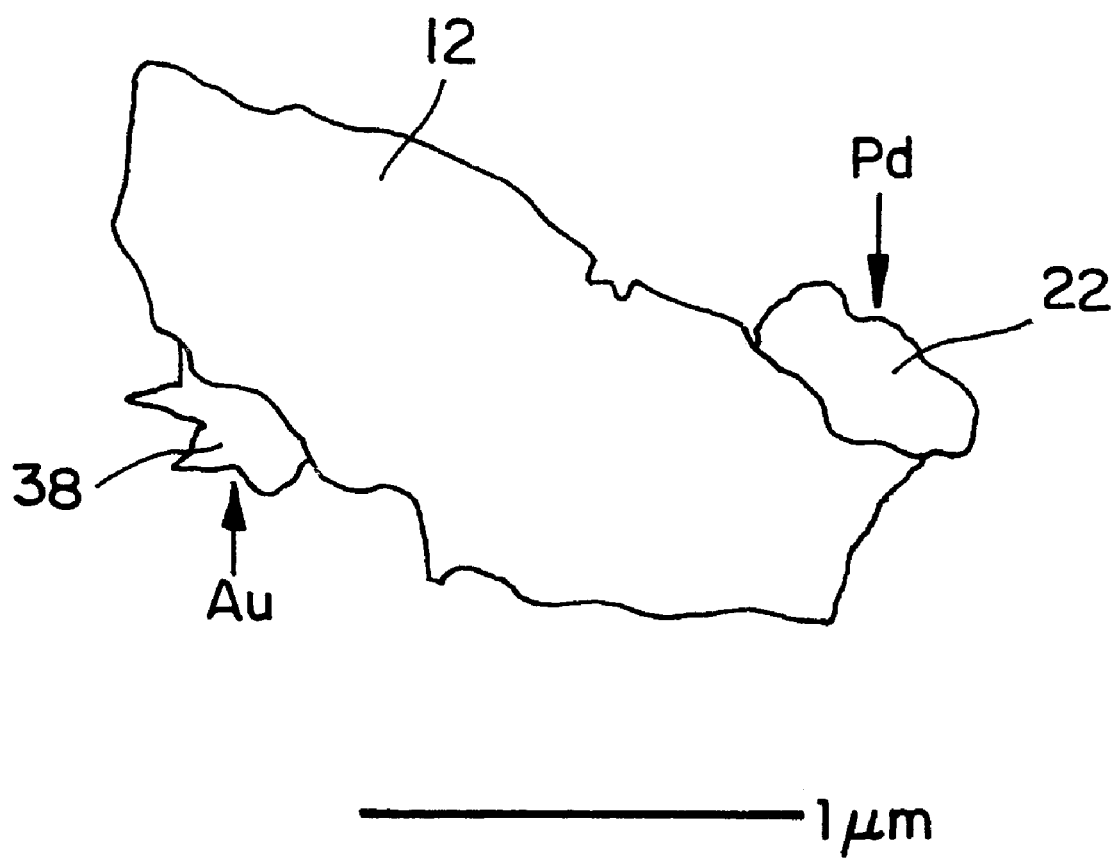
FIG. 10 is an illustration made from a transmission electron micrograph of an isolated graphite particle with Pd and Au introduced sequentially at opposite ends by bipolar electrodeposition using opposite field directions for each electrodeposited metal. The bar below the illustration represents a scale of 1 μm.

Significant deviations from Equation (2) are expected for non-spherical particles such as the graphite powder in the present application, which exists in the form of platelets (best seen in FIG. 10). However, Equation (2) can be used a rough guide indicating that particle radius and the electric field required to induce electrochemistry in a given system are expected to be inversely proportional. Thus, higher fields are required to induce a sufficient overpotential at the particle surface with diminishing particle radius.

In order to carry out electrochemistry at the surface of the particle, a critical voltage difference $V_c$ corresponding to the sum of two half-cell reactions must be reached. With reference to FIG. 2 and Equation (3), for a given particle 12 of radius r and an applied electric field E there will exist two polar regions 18 and 20 defined by a critical angle $\theta_c$ within which electrochemistry will occur. This forms the theoretical basis of toposelective electrodeposition.

$$\theta_c = \cos^{-1}(V_c/2Er) \quad (3)$$

In the system of the present invention, the expected reduction process involves electrodeposition of a catalytic substance 22, schematically illustrated in FIG. 2 by the electrodeposition of catalytic substance 22 on the surface of particle 12 in the cathodic region 18 associated with electrochemical reduction. The corresponding oxidation processes occurring in the anodic region 20 (FIG. 2) have not been identified, but it is believed that they likely involve either the solvents, halide counterions or adventitious water in the specific examples discussed hereinafter. Whatever the oxidation processes are, they do not appear to adversely affect the desired reduction processes involving the electrodeposition of the catalytic substance 22 onto the conductive particulate substrate 12.

A crucial concept in the present invention is the replacement of the traditional chemical reducing agent in the preparation of metal catalysts with an electric field. It should be understood that the "reducing agent" is the cathodically polarized region of the particle which is a result of the applied electric field. The comparison between "chemical reducing agent" and "electric field" is simply operational, referring to the actual parameters controlled in the process of this invention. The inventive process of producing catalysts based on an electric field mediated reduction will generate catalysts of variable activity and perhaps selectivity depending on the electric field parameters (including intensity, time, pulse sequence and direction). The direction of the electric field is particularly important because it offers the ability to control the position of the catalytic substance based on the direction of an electric field vector. This would allow, for example, the ability to position two different catalyst substances at different locations on conductive particulates as described hereinafter.

The process of the present invention is a bipolar electrochemical process for toposelective electrodeposition of a catalytic substance on an electrically conductive particulate substrate comprising: (a) placing the conductive particulate substrate and a source of the catalytic substance into an environment capable of conducting electricity; (b) aligning the conductive particulate substrate on which the catalytic substance is to be deposited with respect to an electric field such that the conductive particulate substrate is not in physical contact with electrodes and such that the catalytic substance will be deposited in a predetermined location on the particulate substrate when an electric field is applied; and (c) creating an electric field of a sufficient strength and for a time sufficient to deposit the catalytic substance from the source of the catalytic substance on the conductive particulate substrate at the predetermined location in substantial alignment with the electric field.

The electrically conductive particulate substrate is a material that has a dielectric constant higher than the dielectric constant of the environment (discussed hereinafter) containing the substrate, and has an average dimension of about 1 nm to about 1 mm. A preferred average dimension for the particulate substrate is about 0.1 µm to about 500 µm. A more preferred average dimension is about 0.5 µm to about 100 µm. In general, the smaller the particle, the higher the electric field should be. The particles of the substrate need not be of uniform size, and if it is desired to deposit different catalytic substances on different particles, the type and size of the conductive particulate substrates may be chosen to have different sizes. Different strength or types of electric fields may be used to control the deposition of the desired catalytic substance on the desired substrate, aided by the choice of appropriately sized particles. The particulate substrate may have any shape, such as spheroidal, platelet or flake-like, cuboidal, rod-like, disk-shaped, ring-shaped, or irregular.

It is desired to consider the size and shape of the catalyst produced according to this invention. In general, high voltages and high currents favor smaller particles because, above the nucleation overpotential, the growth of new centers is favored at the expense of the growth of existing nuclei. Using low frequency voltametry, faster sweep rates tend to encourage more rapid nucleation, thus leading to smaller particles. Catalytic activity and selectivity are dependent upon the size and morphology of the catalyst. From simple geometric considerations, a reduction in crystallite size changes the relative area of different crystal faces which is thought to be responsible for catalytic modulation in many cases. The catalytic activity at step, kink and terrace sites has also been shown to influence the course of certain catalytic reactions. A recent review of the effect of particle size and catalysis covered reactions ranging from oxidation, dehydrogenation, hydrogenation, hydrogenolysis and CO methanation and found size effects in the range of 0.5–100 nm, with strong arguments in favor of the simple geometric consequences of proportion of surface sites with changes in particle sizes. Particularly relevant to environmental concerns, the oxidation of CO on Pd has been found to display a strong correlation with size for particles less than 5 nm. Electronic factors related to particle size have also been suggested to play a major role in catalysis. For example, in the epoxidation of ethylene on silver, catalytic activity seems to correlate with conductivity changes with particle size. The electron deficiency of smaller particles is thought to be responsible for the decrease in catalytic activity of Pd particles for the hydrogenation of alkynes.

The composition of the electrically conductive particulate substrate may be a conductive form of carbon, a metal, a metal alloy, a conductive metal oxide, a conductive polymer, a conductive organic salt crystal, a conductive semiconductor including a doped semiconductor, or mixtures thereof.

The conductive form of carbon may be graphite or known forms of conductive diamond. Graphite is preferred. Preferred metals may be Pt, Au, Al, Ti, V, Cr, Mn, Fe, Co, Ni, Cu, Zn, Ga, Zr, Nb, Mo, Tc, Ru, Rh, Pd, Ag, Cd, In, Sn, W, Re, Os, Ir, Hg, Tl, Pb or Bi and alloys, conductive metal oxides or mixtures thereof. Non-limiting examples of suitable conductive polymers include polypyrrole and its derivatives, polyaniline and its derivatives or polythiophene and its derivatives. A non-limiting example among suitable conductive salt crystal material is a tetrathiafulvene salt. A "conductive semiconductor", as used herein, is one which has sufficient electrically conductive properties to be capable of bipolar polarization using the process of this invention. A conductive semiconductor material preferably comprises doped Si or Ge, or elements of the Periodic Table Groups III and V, such as GaAs, GaP, InP, or elements from the Periodic Table Groups II and VI, such as CdS, CdSe, CdTe, ZnS, ZnSe, ZnTe, HgS, HgSe or HgTe, for example.

The presently preferred electrically conductive particulate substrate is graphite powder having an average dimension of about 0.5 µm to about 100 µm with a spheroid or flake shape.

Proper alignment with the electric field of the electrically conductive particulate substrate in the bipolar electrochemical cell may be more easily, uniformly or consistently accomplished if an optional, electrically nonconductive support (sometimes referred to herein as an "inert" support) is used for the conductive substrate. The inert support may be any material which will prevent the dispersed particulate substrates from excessively agglomerating, is stable under the conditions of the electrodeposition and will allow the particulate substrates to be polarized by the electric field, either because of the properties of the support material or because of the physical disposition of the particulate substrates in the support (e.g. the particulate substrates are retained in pores in inert support).

For some applications an inert support may be used which may later be removed, fully or partially, by dissolution, combustion, sublimation, or another form of degradation. As an example, sucrose, which does not dissolve in a toluene-acetonitrile solution (one of the preferred cell environments), may be used during the time when an electric field is applied, but the sucrose will then be dissolved away with water to leave only the conductive particulate substrate with its electrodeposited catalytic substance.

Preferred electrically nonconductive materials used as inert support for the conductive particulate substrates include, by way of example and not limitation, commonly used supports for catalytic systems, such as alumina, silica or titania in the form of powders, or cellulose in the form of sheets. An especially preferred form of support for the conductive particulate substrates is cellulose paper sheets with a thickness of about 40 to about 80 µm, such as about 60 µm, which is readily available as KIMWIPE® papers.

Attachment or adherence of the conductive particulate substrate to the inert support material may be accomplished by well known techniques. For example, adhering the conductive substrates to particulate supports may be accomplished by chemical reduction of the substrate, such as a metal, directly on the particulate support, such as alumina. The use of support material in the form of sheets, such as cellulosic sheet material, is accomplished by immersing or otherwise impregnating the sheet material in a suspension of the particulate substrates, followed by washing and drying, or preferably by evaporation or nebulizing techniques, involving contacting the sheet material with a suspension of substrate particles in acetone or other highly volatile carrier and then evaporating the carrier, which provides good dispersion of the particles. When the substrate particles are adhered to the sheets, the sheets can be arranged within a bipolar electrochemical cell in any desired arrangement and alignment with each other and with the electrodes before continuing with the process of this invention.

The inert support may be omitted, when for example the conductive particulate substrates can be kept dispersed and in the desired alignment by other forces such as by ionic or steric repulsive forces between colloidal matter or by the characteristics of a gel form of the cell environmental material.

The source of the catalytic substance is a material soluble in the environment such that the material will deposit onto the conductive substrate by an electrochemical reaction induced by the electric field, the material being capable of providing the conductive particulate substrate with catalytic activity with respect to a chemical reaction, compared to a conductive particulate substrate which has not been subjected to the bipolar electrochemical process. The source of the catalytic substance may be a metal ion soluble in the environment capable of forming a deposit on the conductive particle in the form of a metal, a metal oxide or a metal chalcogen, or mixtures of them. The chalcogen is S, Se or Te.

The source of the catalytic substance is preferably a salt or salts containing an ion of Pd, Pt, Ag, Au, Ni, Cu, Co, Fe, Ru, Rh, Cr, Mn, Ir, Os, Re, Zr, Mo, Ti, In, Sn, Hg, Tl, Pb, Bi, Cd, Ce and or mixtures of them. Particularly preferred are salts of Pd, Pt, Rh, Ag, Au, Co, Fe, and Cu, due to their recognized catalytic properties.

The other component of the soluble salt containing the indicated metal ions is an anion component chosen to assure solubility of the desired salt in the environment in which it is used in this invention and to assure that the catalytic substance may be electrodeposited by bipolar electrochemistry onto the electrically conductive particulate substrate. Since there are a number of various types of solvents that may be used to form the environment, there are also a number of anionic components of the salt that could be used in appropriately soluble salts. Preferred anionic components are halides and nitrates, for example, when the environment includes the preferred mixture of toluene and acetonitrile, as discussed hereinafter. The salts can be made using techniques well known to those skilled in the art, or purchased commercially from various sources.

Preferred sources of the catalytic substance are $PdCl_2$ or $AuBr_3$ in a concentration of about 0.05 mM to about 10 mM. The concentration of the salt in the environment should be enough to allow electrodeposition at a reasonably efficient rate, but the concentration should not be so much that the conductivity will be too high to apply the electric field at the intensity or strength desired. Applying these characteristics to the two exemplary salts mentioned above, as noted in the following Examples, $PdCl_2$ more preferably has a concentration of about 1 mM and $AuBr_3$ more preferably has a concentration of about 0.25 mM.

The environment capable of conducting electricity and containing the electrically conductive particulate substrate, the source of the catalytic substance and the electrodes may be a fluid or a gel, and preferably is a liquid or gel. In gel form, made using typical and appropriate gelling agents for the material chosen as the environment in view of the other components in the bipolar electrochemical cell and in view of the process and desired catalyst being produced, the conductive substrate particles can be suspended without using an additional optional support as discussed above. In the preferred embodiment, and especially when the particulate substrate is separately supported in the bipolar electrochemical cell, the environment is a liquid.

Regardless of its form, the environment has a dielectric constant lower than the dielectric constant for the electrically conductive particulate substrate and the environment must be able to solvate the source of the catalytic substance in a form from which the catalytic substance can electrodeposit onto the conductive particulate substrate upon application of an electric field. The selection of an appropriate material or combination of materials depends on the type of particulate substrate used, the type of catalytic substance being deposited, the presence and type of optional support used to support the particulate substrate, and their compatible characteristics, as well as the electric field strength. The environment must not so stabilize the source of the catalytic substance that the catalytic substance cannot be electrodeposited on the substrate when the electric field is applied. Although aqueous media are generally too conductive for the conductive particulate substrates of the size used to make the catalysts of this invention, organic solvent systems such as toluene/acetonitrile mixtures offer a sufficiently resistive environment for high fields (on the order of 5000 V/cm) to be applied, while still allowing electrodeposition to occur.

The environment preferably comprises a liquid, which may be an alkyl or aromatic alcohol, a solvent containing an aromatic compound, a nitrile-containing solvent, a halogenated solvent, an amine-containing solvent, an amide-containing solvent, an ether, a sulfur-containing organic solvent, or miscible mixtures of any of them. Non-limiting examples of these types of materials to form the environment include the following: the alcohol may be methanol, ethanol, isopropanol, n-butanol or t-butanol; the solvent containing an aromatic compound may be toluene, benzene, ethylbenzene, naphthalene or xylene; the nitrile-containing solvent may be acetonitrile, propionitrile or benzonitrile; the halogenated solvent may be methylene chloride, chloroform or carbon tetrachloride; the amine-containing solvent may be triethylamine, pyridine, aniline or N,N-dimethylaniline; the amide-containing solvent may be dimethylformamide and diethylformamide; the ether diethyl ether or tetrahydrofuran; and the sulfur-containing organic solvent may be dimethylsulfoxide, dimethylsulfone or sulfolane.

The presently preferred environment, particularly effective when forming a palladium catalyst by depositing Pd from $PdCl_2$ on graphite particles, is acetonitrile and a mixture of toluene and acetonitrile in which the toluene is present in an amount of up to about 80 vol. %, and more preferably, a 1:1 vol. ratio of toluene/acetonitrile. While acetonitrile alone could be used, the addition of the toluene allows a higher electric field to be applied.

While the electric field in alignment with the conductive substrate may be created by application of an oscillating magnetic field or by electromagnetic radiation inside or outside of a vessel containing the fluid of the environment, the conductive substrate and the source of the catalytic substance, it is presently preferred that the electric field is formed between electrodes comprising at least one anode and at least one cathode, connected to any appropriate voltage source that applies a voltage differential between the oppositely charged electrodes. There are many various types of electrodes which may be used. It is also preferred that the electrodes are in the bipolar electrochemical cell, immersed in the fluid comprising the cell environment, but not in physical contact with the conductive particulate substrate. The electrodes and the conductive substrate are aligned such that the catalytic substance will be deposited in a predetermined location on the conductive particulate substrate when an electric field of sufficient strength is applied between the electrodes for a sufficient time.

The electrodes may be made of any electrically conductive material capable of being connected to a voltage source, preferably a material that does not electrodissolve in the environment of the process. There may be instances where electrodissolvable electrodes are desired, however, where it is desired to deposit material from the electrode on the substrate, for example. The electrode material may be identical or different for each of the electrodes and there may be more than two electrodes, in which case at least one will be of an opposite polarity to the others.

The electrodes may be comprised of the following (or alloys or mixtures of the following): any metal, conductive metal oxide, conductive polymer (such as polypyrrole and its derivatives, polyaniline and its derivatives or polythiophene and its derivatives), conductive salt crystal (such as a tetrathiafulvene salt), or a conductive semiconductor (such as doped Si or Ge, or elements of the Periodic Table Groups III and V, such as GaAs, GaP, InP, or elements from the Periodic Table Groups II and VI, such as CdS, CdSe, CdTe, ZnS, ZnSe, ZnTe, HgS, HgSe or HgTe, for example).

Preferably, the electrodes are comprised of metals or conductive metal oxides of the following group: graphite, Pt, Au, Al, Ti, V, Cr, Mn, Fe, Co, Ni, Cu, Zn, Ga, Zr, Nb, Mo, Tc, Ru, Rh, Pd, Ag, Cd, In, Sn, W, Re, Os, Ir, Hg, Tl, Pb, or Bi, or alloys or mixtures of them. Graphite and platinum are the more preferred electrode materials.

The present invention is based upon bipolar electrochemistry which has as an advantage over other methods of electrodeposition or other such techniques, the ability to apply toposelective electrodeposition to particular target areas of the conductive particulate substrates by the appropriate alignment of the substrate within the applied electric field. The alignment of the electric field may be achieved by appropriately aligning the substrates with respect to the electrodes (or the converse, aligning the electrodes or other components used to create the electric field with respect to the substrates). When the electric field vector is appropriately aligned and a potential difference is applied, the catalytic substance will be deposited in the desired location on the bipolar conductive particulate substrate. Thus, very site-selective electrodeposition can be achieved without physically contacting the substrate in any way with the electrodes.

The bipolar electrochemical process of this invention requires the application of an electric field of a sufficient strength or intensity and duration which is aligned with the conductive substrate and the electrodes or other component used to align the electric field to obtain the desired site-selective electrodeposition on the substrate particles. The deposit may be controlled by controlled modulation of the qualities of the electric field to which the conductive particulate substrate is exposed. Such modulation may be temporal, such as the application of a constant field intensity of a given duration, or the application of a regular or irregular field frequencies or arbitrary waveforms, including pulsing sequences, using equipment and methodologies well known to one skilled in the art of electrodeposition. The modulation may also be spatial, such as the application of homogeneous or inhomogeneous fields including gradients or spatial patterns which may be generated by physical placement of the electrodes or by addressing individual electrodes from an electrode array, when electrodes are used to generate the electric field. This option may be particularly useful to simultaneously generate arrays of catalysts modified by different electric field parameters to rapidly screen for catalytic activity.

The preferred application of an electric field uses a parallel electrode geometry, where the electric field is applied at frequencies ranging from direct current (0 Hz) to about 10 kHz using square, triangular or sinusoidal waveforms or using pulsed electrodeposition involving square or triangular electric field pulses of a duration of about 0.1 ms to about 10 seconds separated by pauses of about 0.1 ms to about 10 seconds with field intensities up to about 100 kV/cm.

Figure 8:
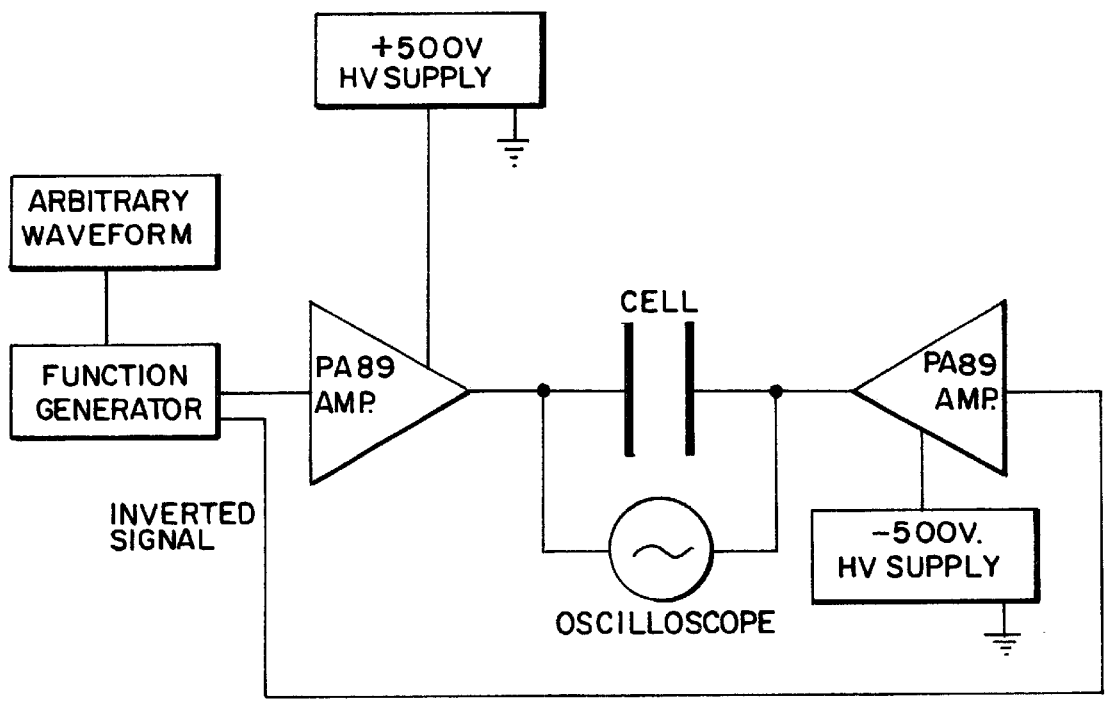
FIG. 8 is an electrical schematic diagram depicting an exemplary low voltage circuit for use in accordance with the process of the present invention.
Figure 9:
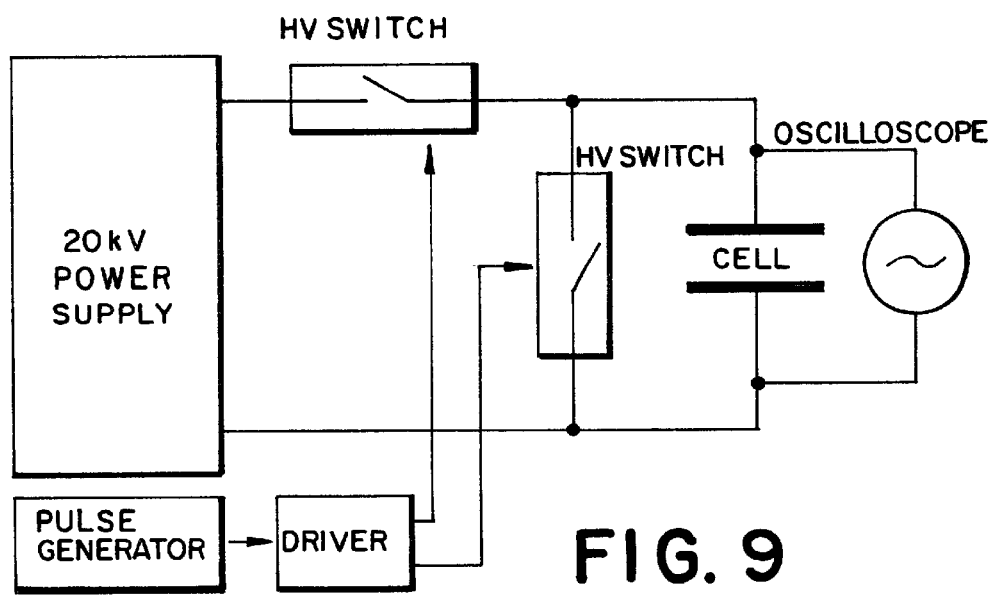
FIG. 9 is an electrical schematic diagram depicting an exemplary high voltage circuit for use in accordance with the process of the present invention.

FIGS. 8 and 9 illustrate non-limiting, exemplary low voltage and high voltage electric circuitry, respectively, that could be used to create the electric field for this invention, although many other systems and other equipment are readily commercially available form a number of sources. Once the parameters of the electric field are known, in view of this disclosure, one skilled in the art of electrodeposition or electrical equipment and circuitry would be able to create and modulate the electric field effects according to the present invention.

The low voltage configuration of FIG. 8 offers more versatility with respect to the application of complex pulse parameters, since it is based on the amplification of output from a programmable function generator. The limitations of this system are that in order to achieve the high fields required for deposition, short inter-electrode separations must be used. For example, in the set-up shown in FIG. 8, the maximum voltage attainable is 1000 V, which means that if fields of 2000 V/cm are desired, the inter-electrode separation cannot be greater than 0.5 cm. To some extent larger surface area electrodes can be used to increase the amount of catalyst produced. However, to greatly increase the amount of catalyst produced, large inter-electrode separations are required, which will necessitate much higher voltages. In this case a 20 kV source can be used which will allow an inter-electrode separation of 10 cm for the application of a 2 kV/cm field.

The simplest way to modulate a high voltage is by creating square waves with fast (sub-microsecond) high-voltage switches, as shown in FIG. 9. In all cases an oscilloscope will be used to monitor pulse distortion due to the capacitive component of the electrochemical cell.

It is presently preferred to create and maintain an appropriate electric field by applying a constant electric field for a period of about 15 seconds to about 2 hours at a field of about 50 to about 20,000 V/cm across two flat electrodes with cross-sectional areas of about 0.1 cm$^2$ to about 100 cm$^2$ separated by a distance of about 0.1 cm to about 15 cm.

When the electric field induces an electrochemical reaction resulting in electrodeposition at the surface of the conductive particulate substrate (as schematically illustrated in FIG. 2, by electrodeposited substance 22 in the area 18), leading to a modulation in catalytic activity, a counterbalancing electrochemical reaction must ensue on the opposite side of the substrate (area 20 as illustrated in FIG. 2), which may involve an electrochemical reaction of the solvent, some impurity in the solvent intentionally or unintentionally added, the conductive particulate substrate, the inert support or products originating from the electrodes or the reaction vessel. It is not necessary to determine the exact nature of this counterbalancing electrochemical reaction to exploit the present invention.

However, since the field required to induce bipolar electrochemistry is related to the difference in the electrochemical half-cell potentials between the two electrochemical reactions, certain additives may be introduced for the specific purpose of acting as sacrificial counter reactions. This type of approach has been used in photo electrolysis using semiconductor dispersions, where a sacrificial oxidizable agent is introduced to increase the efficiency of hydrogen generation or photoelectrodeposition and avoid photoanodic corrosion of the semiconductor. Typical materials used in these cases are amines such as EDTA (ethylenediaminetetraacetic acid); acids such as formic, acetic, oxalic; sulfides; sulfites; and other various alcohols and amines. Care must be taken since spontaneous (electroless) deposition will occur at random sites on the conductive particulate substrate if the coupling of the electrochemical process leading to catalytic activity and the sacrificial counter reaction has a negative free energy.

The catalysts made according to the process of this invention may have many diverse uses. Catalysis is defined as the modification of the course of a given reaction with respect to either the rate or the selectivity (the ratio of the products of a reaction after a given time or a change in the types of products obtained) relative to the rate or selectivity of the reaction in the absence of the catalyst. The reaction in question may be gas or liquid phase at any temperature where the catalyst is stable.

Non-limiting examples of reactions of commercial importance which may be catalyzed by catalysts prepared by the present invention include, for instance: hydrogenation of aromatics, such as benzene, toluene and tetralin; hydrogenation of alkenes, such as ethylene and crotonaldehyde; hydrogenation of alkynes, such as acetylene; hydrogenation of nitrites, such as benzonitrile; hydrogenation of carbonyl compounds, such as benzophenone, acetophenone and benzaldehyde; hydrogenation of organic acids, such as hexanoic acid, lauric acid, oleic acid and benzoic acid; hydrogenation of nitrate; oxidation of methane and other hydrocarbons; oxidation of CO or NO; oxidation of alcohols, such as cinnamyl alcohol; oxidation of halogenated hydrocarbons, such as trichloro-methane; reduction of NO; oxidation of volatile organic compounds, such as methanol, acetone and methylene chloride; hydrosilation of alkenes; dehydrogenation of alcohols, such as ethanol; carbonylation of alcohols, such as methanol; hydration of nitriles, such as acrylonitrile; hydrogenolysis of hydrocarbons, such as ethane, cyclopropane or chlorofluorocarbons, such as 1,1,2-trichlorotrifluoroethane or dichlorodifluoromethane; dehydrogenation of hydrocarbons, such as ethane and cyclohexane; $NO_2$ decomposition; dehydrochlorination of chlorofluorocarbons, such as 1,1-difluorotetrachloroethane; epoxidation of alkenes, such as propene; isomerization of hydrocarbons; and hydroformylation of hydrocarbons; among many others.

Alternative reaction designs would also include electrocatalysis where an electric field or applied voltage would be applied during the course of the reaction, provided the catalyst was prepared using the present invention, and includes: electro-oxidation of acids such as formic acid; electro-oxidation of alcohols, such as methanol, ethanol and ethylene glycol; electro-oxidation of aldehydes, such as formaldehyde; electro-oxidation of carbon monoxide; electro-reduction of carbonyl compounds, such as acetophenone or benzaldehyde; and electroreduction of nitrites such as 1-(2-cyanoethyl pyrrolidine).

Additional examples of preferred reactions which could be catalyzed by catalysts prepared according to the present invention include, without limitation, reactions which have been shown, in the literature, to be dependent (with respect to selectivity or activity) upon voltage parameters when electrodeposited or dependent upon the size or morphology of the catalytic substance, regardless of the method of preparation. Such reactions include, by way of example only: oxidation of carbon monoxide, cyclopropane, ethane, methane and carbohydrates, such as methyl □-D-glucopyranoside; ethylene epoxidation; hydrogenation of ethylene, 1-hexene, cyclohexene, toluene, 1-butene, 1-butyne, butadiene, isoprene and nitro compounds; isomerization of buta-1,3-diene, but-1-ene and pentane; semihydrogenation of but-1-yne; hydrogenolysis of methylcyclopentane, neopentane, ethane, propane and n-pentane; methanation of carbon monoxide; the reaction of CO and NO; electro-oxidation of methanol; and electrocatalytic hydrogenation of benzaldehyde and acetophenone.

Non-limiting examples of catalysts most typically used in the foregoing reactions are Pt, Pd, Ru, Co, Ni, Ir, Os, Rh, Ag, Au and Fe.

The invention will now be described in more detail with reference to the following specific, non-limiting examples.

EXAMPLE 1

This example demonstrates the use of a bipolar electrochemical cell to electrodeposit palladium on a specific portion of graphite particles according to the present invention.

A schematic representation depicting the preparation of a catalyst is shown in FIG. 3 which comprises three related figures, FIG. 3A, FIG. 3B, and FIG. 3C. FIG. 3A schematically represents a bipolar electrochemical cell depicting the beginning of the formation of an exemplary catalyst according to this invention. For clarity, the figure is not drawn to scale and only the reactions on the cathodically polarized region of the graphite particles are shown. Also for clarity, the central portion of each of FIGS. 3A, 3B, and 3C indicated by the bracket 36 below FIG. 3C is expanded and enlarged.

As shown in FIG. 3A, the cell comprises a vessel 24 containing a liquid 26 forming the environmental medium for the electrochemical process. A flat graphite cathode 14 and a flat graphite anode 16, each in the shape of a square with an area of 2 cm×2 cm, were placed within the vessel 14. Graphite particles 12 (nominally 1–2 $\mu$m in average dimension) were dispersed onto one side of 60 $\mu$m-thick cellulose paper sheets 28 by nebulizing an acetone suspension of the particles. The graphite powder was present as 2.5% by weight of the total dry paper support. The sheets 28 with the particles 12 were then stacked to a thickness of 0.5 cm and sandwiched between the two electrodes 14, 16. The liquid environment 26 was established by adding to the vessel 24 a 1 mM solution of $PdCl_2$ in toluene/acetonitrile (1:1 by volume). A 1,000 volt power supply 30 was connected by a lead wire 32 to the cathode 14 and by a lead wire 34 to the anode 16.

Electric fields were applied by imposing a voltage differential between the electrodes for 15 min. each, at field intensities of 500 V/cm, 1000 V/cm and 2000 V/cm, to make catalysts that were analyzed in the following Example 2, along with samples taken of the product produced after 15 min. without the application of any electric field (0 V/cm).

As schematically depicted in FIG. 3A, upon creation of a sufficient electric field, the substrate particles 12 become polarized such that they have a cathodic (negative) region and an anodic (positive) region, by virtue of their alignment within the cell between the electrodes. Under the action of the electric field, as illustrated schematically in FIGS. 3A and 3B, $Pd^{2+}$ is liberated, while Pd metal 22 is electrodeposited on the cathodic region of the substrate particles 12 in a direction extending away from the cathode 14 and toward the anode 16. After the electric field has been applied for a sufficient time, 15 min. in the case of this Example, application of the potential difference between the electrodes was terminated by switching off the power supply 30, which removes the electric field. This results in catalyst particles comprising the Pd metal 22 deposited onto the desired, site-selected area of the graphite articles 12, as depicted in FIG. 3C. Immediately after the field was removed, the papers were washed exhaustively with acetone to remove unreacted $PdCl_2$, then dried and kept in a dessicator. Samples of the catalysts produced were then tested for to determine the extent of electrodeposition of the Pd metal on the graphite particles in the following Example 2 and for their catalytic ability in the following Example 3.

EXAMPLE 2

A crucial concept of the present invention is control of the properties of catalytic systems by modulating electric field parameters during their preparation. This Example studies the differences in the amount of Pd applied to the graphite particulate substrates using different field intensities.

FIG. 4 is a graph depicting the Pd/C percent ratio for the catalysts prepared in Example 1 at the following field intensities: point a, 0 V/cm; point b, 500 V/cm; point c, 1000 V/cm; and point d, 2000 V/cm; as well as a control curve. The ratio was determined after analysis of samples of the catalysts by atomic absorption from the samples digested in aqua regia. The control curve corresponds to the theoretical Pd/C percent ratio for experiments carried out in the absence of graphite, assuming that the same amount of graphite would have been present as in the upper curve.

FIG. 4 shows that more Pd was deposited on the graphite particles at higher field intensities, based on the average of three experiments, where the average standard deviation is ±0.16 for the upper curve and ±0.04 for the control curve, respectively. Exposing electric fields in the absence of graphite particles led to no increase in Pd content (see FIG. 4, control curve). Apparently some palladium is not removed by thorough washing, with contributions of palladium from the paper and from the graphite itself, as shown by point a in FIG. 4. This residual palladium is presumably still in ionic form, since no catalytic activity is detected from such samples (FIG. 5, discussed below).

EXAMPLE 3

This Example studies the different degrees of catalysis using the catalysts of Example 1.

Figure 5:
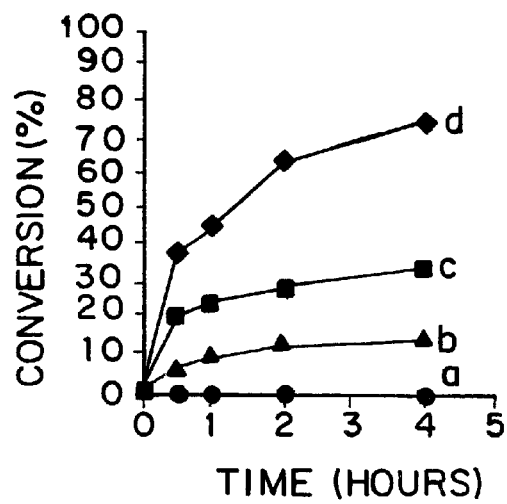
FIG. 5 is a graph depicting the percent conversion of crotonaldehyde to butyraldehyde under 1 atm of hydrogen for the same mass of total dry paper support and catalyst. This graph represents the catalytic capability of each of the products a, b, c, and d prepared with respect to the data shown in the graph of FIG. 4.

Regarding the data set forth in the graph of FIG. 5, the samples of the different catalysts were used to catalyze hydrogenation of an alkene, namely crotonaldehyde (60 mM in ethanol) to butyraldehyde under 1 atm of hydrogen for the same mass (400 mg) of total dry paper support and catalyst. The conversion to butyraldehyde was quantified by gas chromatographic analysis. The results of three experiments, with an average standard deviation of ±3.68, are shown in the graph of FIG. 5, which depicts the percent conversion of crotonaldehyde to butyraldehyde versus time. This graph represents the catalytic capability of each of the products resulting in line a (0 V/cm), line b (500 V/cm), line c (1000 V/cm) and line d (2000 V/cm).

Figure 6:
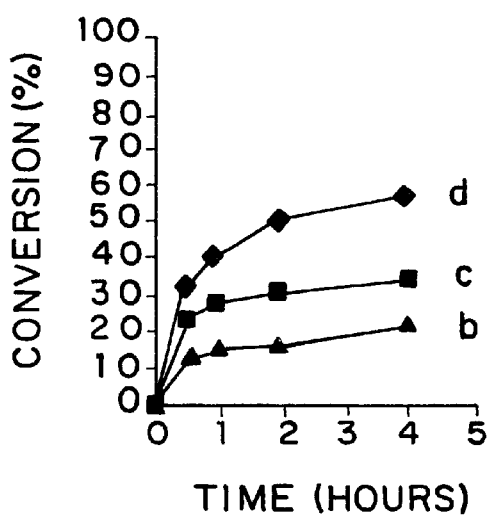
FIG. 6 is a graph showing the percent conversion of crotonaldehyde to butyraldehyde over time under the conditions as used with respect to FIG. 5, except that the total amount of Pd was kept constant.

Two different types of assays were used to investigate the effect of the electric field intensity on the resulting activity of the catalyst. In the study relating to FIG. 5, the same total weight of the graphite particulate substrates and paper support is used. In the study relating to FIG. 6, conversion of crotonaldehyde to butyraldehyde versus time was determined as was done regarding FIG. 5, except that the total amount of Pd (as determined by atomic absorption) was kept constant at 0.114 mg. FIG. 6 shows the results of three experiments, where the average standard deviation is ±4.41. The graph of FIG. 6 represents the catalytic capability of each of the products made in Example 1 as characterized in Example 2 in the graph of FIG. 4. Thus, FIG. 6 shows the results using the catalysts prepared at 500 V/cm in line b, at 1000 v/cm in line c, and at 2000 V/cm in line d.

Clearly, there is a strong correlation between the electric field intensity and catalytic activity from both methods of analysis, namely, the higher the field intensity, with higher Pd deposit, the greater the catalytic ability of the catalysts produced.

It should be pointed out that in FIG. 6, no background correction was made for the residual palladium ions found in the absence of an electric field (0 V/cm, corresponding to point a of FIG. 4). Such a correction cannot be carried out in a straightforward fashion because the application of the electric field appears to deplete this background level substantially. This is evident from the atomic absorption results of the 500 V/cm experiment (FIG. 4, point b) that show virtually the same loading as the zero field experiment (FIG. 4, point a), but with a vastly different catalytic activity (compare FIG. 5, lines a and b).

EXAMPLE 4

Figure 7:
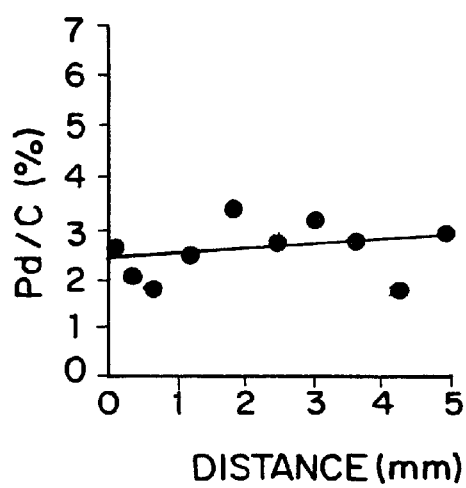
FIG. 7 is a graph depicting the Pd/C percent ratio determined at various positions between the anode (leftmost point of the graph) and the cathode (rightmost point of the graph) formed using an electric field intensity of 2000 V/cm (corresponding to point d of FIG. 4).

In order to assure that the palladium was indeed being deposited by a bipolar mechanism evenly throughout the volume of the inert matrix formed by the cellulose supporting sheets, the palladium content at various positions between the two electrodes was analyzed. If the palladium were simply being deposited at the cathodic feeder electrode, one would expect to see the amount of palladium maximal at the cathodic region and decreasing extremely rapidly in the regions approaching the anode. FIG. 7 is a graph depicting the Pd/C percent ratio determined at various positions between the anode (leftmost point of the graph) and the cathode (rightmost point of the graph) formed using an electric field intensity of 2000 V/cm (corresponding to point d of FIG. 4). As shown in FIG. 7, the palladium seems to be fairly evenly dispersed throughout the supported graphite particulate substrates between the anode and the cathode, thus indicating that the catalyst was prepared by bipolar electrodeposition.

EXAMPLE 5

This Example demonstrates the toposelectivity of bipolar electrodeposition resulting by using bipolar electrochemistry to deposit palladium onto graphite particulate substrates and then exposing the palladium derivatized graphite particles to a gold tribromide solution and reversing the field direction.

Using the experimental conditions described in Example 1, the graphite powder supported by the cellulose paper was first exposed to a field of 2.0 kV/cm for 15 min. in the presence of a 1 mM $PdCl_2$ solution in 1:1 toluene/acetonitrile, followed by washing with acetone and drying. The procedure was then repeated with a 0.25 mM solution of $AuBr_3$ in 1:1 toluene/acetonitrile with an identical field and time duration, but in the opposite direction. An illustration taken from a transmission electron micrograph of a particle obtained by such a treatment is shown in FIG. 10. Energy Dispersive X-Ray analysis indicated that palladium 22 and gold 38 were deposited only locally at opposite ends of the graphite particle 12.

Taken together, the results of the experiments of all of the Examples demonstrate the toposelective preparation of a bipolar electrodeposited catalyst, with the catalytic activity being modulated by controlling the applied electric field intensity.

As used in this specification and the following claims, unless otherwise stated to the contrary, a reference to a word as the singular, including the use of the articles "a" and "an", shall be interpreted to include the plural, and is an inclusive, rather than an exclusive use of the word. Thus, if a term refers, for example, to a component, an element or a step, and if a product or process otherwise is within the language of the term except that there is more than one of the same component, element or step, the product or process would also be within the language of the term.

It will be appreciated by those skilled in the art in view of this disclosure that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A bipolar electrochemical process for toposelective electrodeposition of a catalytic substance on an electrically conductive particulate substrate comprising:
   (a) placing the conductive particulate substrate and a source of the catalytic substance into an electrically conductive environment;
   (b) aligning the conductive particulate substrate on which the catalytic substance is to be deposited with respect to an electric field such that the conductive particulate substrate is not in physical contact with electrodes and such that the catalytic substance will be deposited in a predetermined location on the particulate substrate when an electric field is applied; and
   (c) creating an electric field of a sufficient strength and for a time sufficient to deposit the catalytic substance from the source of the catalytic substance on the conductive particulate substrate at the predetermined location in substantial alignment with the electric field.

2. The process of claim 1 further comprising placing the electrodes within the environment not in physical contact with the conductive particulate substrate but aligned with the conductive particulate substrate such that the catalytic substance is deposited in the predetermined location on the particulate substrate when the electric field is applied between the electrodes, and applying a voltage to the electrodes to create the electric field.

3. The process of claim 1 further comprising a supporting the conductive particulate substrate on an electrically nonconductive support in the environment.

4. The process of claim 3 further comprising supporting a plurality of conductive particulate substrates on the electrically nonconductive support in the environment.

5. The process of claims 3 wherein the electrically nonconductive support is selected from the group consisting of particulate material and cellulosic sheet material.

6. The process of claim 5 wherein a plurality of conductive particulate substrates are supported between a plurality of layers of cellulosic sheet material aligned between the electrodes.

7. The process of claim 1 wherein the source of the catalytic substance is a material soluble in the environment such that the material is deposited onto the conductive substrate by an electrochemical reaction induced by the electric field, the material being capable of providing the conductive particulate substrate with catalytic activity with respect to a chemical reaction compared to a conductive particulate substrate which has not been subjected to the bipolar electrochemical process.

8. The process of claim 1 wherein the source of the catalytic substance is selected from the group consisting of a metal ion soluble in the environment capable of forming a deposit on the conductive particle in the form of one of a metal, a metal oxide, a metal chalcogen, and mixtures thereof, wherein the chalcogen is selected from the group consisting of S, Se and Te.

9. The process of claim 8 wherein the source of the catalytic substance is a salt containing an ion selected from the group consisting of Pd, Pt, Ag, Au, Ni, Cu, Co, Fe, Ru, Rh, Cr, Mn, Ir, Os, Re, Zr, Mo, Ti, In, Sn, Hg, Tl, Pb, Bi, Cd, Ce and mixtures thereof.

10. The process of claim 9 wherein the source of the catalytic substance is selected from the group consisting of $PdCl_2$ and $AuBr_3$ in a concentration of about 0.05 mM to about 10 mM.

11. The process of claim 1 wherein the electrically conductive particulate substrate is a material that has a dielectric constant higher than the dielectric constant of the environment, and has an average dimension of about 1 nm to about 1 mm.

12. The process of claim 11 wherein the electrically conductive particulate substrate is a conductive form of carbon, a metal, a metal alloy, a conductive metal oxide, a conductive polymer, a conductive organic salt crystal, a conductive semiconductor, and mixtures thereof.

13. The process of claim 1 wherein the electrically conductive particulate substrate has an average dimension of about 0.1 $\mu$m to about 500 $\mu$m and is selected from the group consisting of graphite, Pt, Au, Al, Ti, V, Cr, Mn, Fe, Co, Ni, Cu, Zn, Ga, Zr, Nb, Mo, Tc, Ru, Rh, Pd, Ag, Cd, In, Sn, W, Re, Os, Ir, Hg, Tl, Pb, Bi and alloys and mixtures thereof.

14. The process of claim 13 wherein the electrically conductive particulate substrate is graphite powder having an average dimension of about 0.5 $\mu$m to about 100 $\mu$m and has a shape selected from the group consisting of spheroid and flake.

15. The process of claim 1 wherein the environment is selected from the group consisting of a fluid and a gel, the environment having a dielectric constant lower than the dielectric constant for the electrically conductive particulate substrate, the environment further being able to solvate the source of the catalytic substance in a form in which the catalytic substance electrodeposits onto the conductive particulate substrate upon application of the electric field.

16. The process of claim 15 wherein the environment comprises a liquid selected from the group consisting of an alcohol, a solvent containing an aromatic compound, a nitrile-containing solvent, a halogenated solvent, an amine-containing solvent, an amide-containing solvent, an ether, a sulfur-containing organic solvent, and miscible mixtures thereof.

17. The process of claim 16 wherein the alcohol is selected from the group consisting of methanol, ethanol, isopropanol, n-butanol and t-butanol; the solvent containing an aromatic compound is selected from the group consisting of toluene, benzene, ethylbenzene, naphthalene and xylene; the nitrile-containing solvent is selected from the group consisting of acetonitrile, propionitrile and benzonitrile; the halogenated solvent is selected from the group consisting of methylene chloride, chloroform and carbon tetrachloride; the amine-containing solvent is selected from the group consisting of triethylamine, pyridine, aniline and N,N-dimethylaniline; the amide-containing solvent is selected from the group consisting of dimethylformamide and diethylformamide; the ether is selected from the group consisting of diethyl ether and tetrahydrofuran; and the sulfur-containing organic solvent is selected from the group consisting of dimethylsulfoxide, dimethylsulfone and sulfolane.

18. The process of claim 16 wherein the environment is selected from the group consisting of acetonitrile and a mixture of toluene and acetonitrile in which the toluene is present in an amount of up to about 80 volume percent.

19. The process of claim 1 wherein each electrode comprises a material that does not electrodissolve in the environment.

20. The process of claim 1 wherein each electrode independently comprises a material selected from the group consisting of a conductive form of carbon, a metal, a metal alloy, a conductive metal oxide, a conductive polymer, a conductive organic salt crystal, a conductive semiconductor, and mixtures thereof.

21. The process of claim 20 wherein each electrode independently is selected from the group consisting of graphite, a metal and a conductive metal oxide, wherein the metal and the metal component of the conductive metal oxide independently is selected from the group consisting of Pt, Au, Al, Ti, V, Cr, Mn, Fe, Co, Ni, Cu, Zn, Ga, Zr, Nb, Mo, Tc, Ru, Rh, Pd, Ag, Cd, In, Sn, W, Re, Os, Ir, Hg, Tl, Pb, Bi, alloys thereof and mixtures thereof.

22. The process of claim 21 wherein each electrode is independently selected from the group consisting of graphite and platinum.

23. The process of claim 1 further comprising depositing the catalytic substance in a second predetermined location on the electrically conductive particulate substrate.

24. The process of claim 1 further comprising toposelectively depositing using bipolar electrochemistry more than one catalytic substance in another predetermined location on one of the electrically conductive particulate substrate and the catalytic substance previously deposited thereon.

25. The process of claim 1 wherein the toposelective bipolar electrochemical deposition of the catalytic substance is controlled by controlling at least one of the direction of the electric field with respect to the alignment of the electrically conductive particulate substrate therein, the intensity of the electric field, the duration of the time of application of the electric field is applied, the frequency of the electric field pulses, and waveform modulation.

* * * * *